US012665191B2

(12) United States Patent
Slavik et al.

(10) Patent No.: US 12,665,191 B2
(45) Date of Patent: Jun. 23, 2026

(54) ADVANCED MONOLITHIC SULPHUR WAFER-LIKE CATHODE BASED ON HYPER-BRANCHED SUPER-STRUCTURES AND METHOD OF MANUFACTURE THEREOF

(71) Applicant: Theion GMBH, Berlin (DE)

(72) Inventors: Marek Slavik, Sered (SK); Andrea Strakova Fedorkova, Košice (SK); Tomáš Kazda, Brno (CZ); Matti Knaapila, Kgs. Lyngby (DK)

(73) Assignee: THEION GMBH, Berlin (DE)

( * ) Notice: Subject to any disclaimer, the term of this patent is extended or adjusted under 35 U.S.C. 154(b) by 623 days.

(21) Appl. No.: 17/926,503

(22) PCT Filed: May 19, 2021

(86) PCT No.: PCT/EP2021/063234
§ 371 (c)(1),
(2) Date: Nov. 18, 2022

(87) PCT Pub. No.: WO2021/233965
PCT Pub. Date: Nov. 25, 2021

(65) Prior Publication Data
US 2024/0088363 A1 Mar. 14, 2024

(30) Foreign Application Priority Data
May 19, 2020 (EP) ..................................... 20175368

(51) Int. Cl.
| H01M 4/38 | (2006.01) |
| H01M 4/02 | (2006.01) |
| H01M 4/04 | (2006.01) |

(52) U.S. Cl.
CPC ............... *H01M 4/38* (2013.01); *H01M 4/04* (2013.01); *H01M 2004/028* (2013.01)

(58) Field of Classification Search
CPC ..... H01M 4/38; H01M 4/04; H01M 2004/028
See application file for complete search history.

(56) References Cited

U.S. PATENT DOCUMENTS

| 4,139,347 | A | * | 2/1979 | Tse ...................... C01B 17/0216 165/236 |
| 8,974,960 | B2 | | 3/2015 | Manthiram et al. |
| 10,062,900 | B2 | | 8/2018 | Brucner et al. |

(Continued)

FOREIGN PATENT DOCUMENTS

| CN | 104254938 A | 12/2014 |
| JP | 2011222389 A | 11/2011 |

(Continued)

OTHER PUBLICATIONS

Office Action in counterpart JP2022-571253, 8 pages, and Machine Translation, 10 pages, May 31, 2024.

(Continued)

*Primary Examiner* — Matthew J Merkling
(74) *Attorney, Agent, or Firm* — Blank Rome LLP

(57) ABSTRACT

The present invention relates to a cathode for a rechargeable battery with a monolithic-sulphur-structure cathode body, namely a sulphur wafer, comprising heterogenous branched and/or hyperbranched structures of twinned sulphur crystals as an active electrode material.

15 Claims, 1 Drawing Sheet

1ˢᵗ generation of twinning     2ⁿᵈ generation of twinning     3ʳᵈ generation of twinning

(56) References Cited

U.S. PATENT DOCUMENTS

| | | | |
|---|---|---|---|
| 10,910,636 B2 | 2/2021 | Wang et al. | |
| 11,081,691 B2 | 8/2021 | Aria et al. | |
| 2006/0073386 A1 | 4/2006 | Pope et al. | |
| 2011/0174155 A1* | 7/2011 | Fraser | C01B 17/021 |
| | | | 95/36 |
| 2013/0164626 A1 | 6/2013 | Manthiram et al. | |
| 2014/0308198 A1* | 10/2014 | Falconieri | C04B 28/36 |
| | | | 62/62 |
| 2015/0340734 A1* | 11/2015 | Homma | H01M 10/0525 |
| | | | 429/322 |
| 2020/0343578 A1* | 10/2020 | Oberwalder | H01M 10/052 |
| 2021/0111401 A1* | 4/2021 | Sedlarikova | H01M 4/139 |
| 2023/0257266 A1* | 8/2023 | Cometti | C01B 17/0216 |
| | | | 23/293 S |
| 2024/0088363 A1 | 3/2024 | Slavik et al. | |

FOREIGN PATENT DOCUMENTS

| | | | |
|---|---|---|---|
| JP | 2015506899 A | 3/2015 | |
| JP | 2015508220 A | 3/2015 | |
| JP | 2016528678 A | 9/2016 | |
| JP | 2019129142 A | 8/2019 | |
| KR | 10-2847772 | 8/2025 | |
| WO | 2011147924 A1 | 12/2011 | |
| WO | WO-2011/14924 A1 | 12/2011 | |
| WO | WO-2019/081367 A1 | 5/2019 | |

OTHER PUBLICATIONS

International Search Report and Written Opinion for PCT/EP2021/063234, dated Jun. 29, 2021, 9 pages.

K. Xi, et al., "Binder Free Three-Dimensional Sulphur/Few-Layer Graphene Foam Cathode with Enhanced High-Rate Capability for Rechargeable Lithium Sulphur Batteries", Nanoscale; vol. 6, 2014; 9 pgs.

* cited by examiner

Positive electrode with

Monoli-
thic
sulphur
wafer

1ˢᵗ generation
of twinning

2ⁿᵈ generation
of twinning

3ʳᵈ generation
of twinning

ADVANCED MONOLITHIC SULPHUR WAFER-LIKE CATHODE BASED ON HYPER-BRANCHED SUPER-STRUCTURES AND METHOD OF MANUFACTURE THEREOF

RELATED APPLICATIONS

This application is a national phase of PCT/EP2021/063234, filed on May 19, 2021, which claims priority to European Patent Application No. 20175368.8, filed on May 19, 2020. The contents of these applications are hereby incorporated by reference in their entirety.

BACKGROUND

The present invention relates to advanced positive electrode—cathode for an alkali-ion and or alkali-earth ion sulphur battery and battery having the same, and, more particularly, to a lithium-sulphur secondary battery exhibiting branched and or hyper branched monolithic cathode super structures and more specifically, to a method of production the same monolithic sulphur allotrope structure.

Due to the rapid growth of e-mobility and development of market demand for portable electronic equipment, there are growing demands for advanced secondary batteries with higher energies to suit the ongoing request of higher operation radius from the users of electric cars or for longer battery life originated from the growing sector of portable electronic device.

KAI XI ET AL: "Binder free three-dimensional sulfur/few-layer graphene foam cathode with enhanced high-rate capability for rechargeable lithium sulphur batteries", NANOSCALE, vol. 6, 1 Jan. 2014 (2014-01-01), p. 5746-5753 discloses a 3D graphene foam backbone on the surface of which sulfur is deposited. THGsi is achieved by loading sulphur onto a freestanding porous and interconnected 3D network of FLG (few-layered graphene) via a sulphur solution infiltration method. As can be learned from the extracted FIG. 7, this structure is a sulphur layered backbone consisting of a graphene network/foam. The structural integrity (self support)/structural backbone of the cathode therefore doesn't come from the sulphur but from the graphene foam instead. IN comparison to this disclosure according to the present invention the structural backbone of the cathode is actually provided by the sulphur crystals/crystallinity itself.

WO 2011/147924 A1 discloses the use of expanded graphite in lithium/sulphur solid composite batteries. According to page 13 the lithium cathode is actually made from a slurry comprising sulphur and the expanded graphite, casting the slurry on a substrate or placing into a mold and removing some or all of the liquid medium from the slurry to form a solid composite. Thus, WO 2011/147924 A1 teaches the production of a sulphur cathode from a slurry and therefore from a suspension of solid particles that are dried and thereby compacted to the solid composite. This means that although the sulphur particles may have crystallinity the cathode comprises smaller pieces of crystals with interfaces. In contrast, according to the present invention a macroscopic crystalline sulphur structure, namely a crystalline monolithic-sulphur-structure cathode body which is a grown sulphur wafer is provided.

US2013/164626 A1 discloses a binder free sulphur carbon nanotubes composite cathode for a rechargeable lithium sulphur battery. Provision of the sulphur carbon composite is made in the form of sheets of carbon nanotubes on which sulphur nucleates from an aqueous solution. By self-organization of those layered carbon nanotubes the solid electrode material is formed without any binder (paragraph 70).

Thus, it is individual sulphur crystals on carbon nanotubes (paragraph 16). However, those crystals are nanocrystalline (paragraph 86). Accordingly, a cathode where the backbone consists of crystalline sulphur itself which is self-supporting, hence a crystalline monolithic-sulphur-structure cathode body, namely grown sulphur wafer, is not disclosed.

Recently, coinciding with the trend toward small and compact energy carriers hereby defined as batteries with higher volumetric capacity stated as Wh/l, and light defined as batteries with high gravimetric energy content stated as Wh/kg. More particular there is mismatch in understanding the definition of "high energy battery" terminology where the most preferable demand to the battery is to have high gravimetric energy in Wh/kg but in reality its opposite a volumetric capacity Wh/1 is more demanding due the fact that available space as example available space/volume for insertion of battery into the smartphone, notebook or in electric car platform those are the more limiting factors than weight so there is need of battery with both high volumetric and gravimetric energy content—LiS lithium sulphur battery is one of the most promising types of post-lithium batteries which are based on multi-step redox conversion reactions with theoretical energy content of 1672 mAh/g based on 2 e$^-$ transfer per sulphur atom $S_8+16Li^++16e^- \rightarrow 8Li_2S$ so totally a 16 e$^-$ per $S_8$ molecule which gives $\approx$2650 Wh/kg and $\approx$2860 Wh/l.

It's clear that LiS batteries would still need to address several limiting factors of sulphur such as low ionic and e$^-$ conductivity, low density, volumetric fluctuations defined for orthorhombic-$\alpha$ allotrope at 79% and 70% for monoclinic-$\beta$ allotrope and low areal active mass utilization factor. Existing inventions and patents related to the LiS batteries shows and confirms that proposed solutions and subsequently claims could not be able to properly deal with the specific properties of sulphur because of their focus on adapting existing slurry-based cell production methods used in traditional Li-ion batteries. In existing state-of-the-art Li-ion batteries which are preferable based on TM transitions metals as cathodes with true densities in the range of 5.1 g/cm$^3$ (LiCoO$_2$) which is more than 2x times higher in comparison to sulphur 2.07 g/cm$^3$ so in order to compete with present Li-ion cell chemistry in volumetric energy densities with Li—S batteries a very advanced concepts and subsequently methods is needed to unlock the theoretical potential of sulphur as cathode active mass.

DETAILED DESCRIPTION

Figure 1:
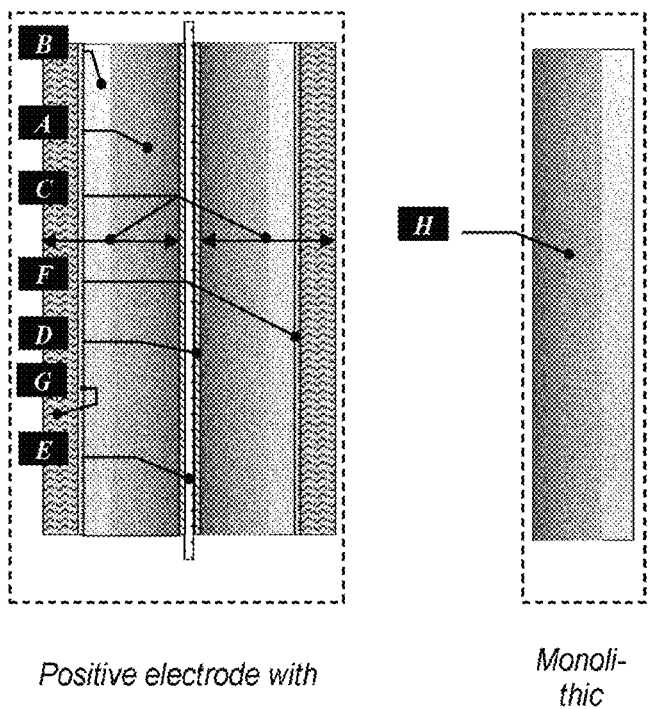
FIG. 1 shows a final monolithic sulphur wafer assembled into cathode.

This particular patent addresses the need for a safe, cost effective, environmentally friendly sulphur cathode with both high volumetric and gravimetric energy content while paying respect to the nature by not using TM (transition metals) whose production processes are bound into the extensive mining, refining and chemical treatment in order to produce and subsequently transport precursor needed for synthesis of conventional cathodes used in the state-of-the-art Li-ion batteries. Sulphur is cheap, abundant, nontoxic and the most important is its global presence is mostly as by-product (waste) of chemical refining as example natural gas so right from the beginning the Li—S battery have the most positive environmental impact to the planet.

To optimize lithium-sulphur battery technologies, it is essential to fully understand the properties of sulphur allotropes and subsequently a production process and the associated parameters as well as their influence on the both electrochemical and chemical processes within the cell.

Although lithium-sulphur batteries are expected to have 3× times high energy content than existing state-of-the-art Li-ion batteries, their practical use is hampered by the existence of many scientific and technical problems that need to be properly solved. Hereby, according to the fineness we summarized the challenges related to the commercialization of the lithium-sulphur batteries defined here as experimental 20Ah LiS pouch battery with parameters: 700/700/700 (Wh/kg, Wh/l, 700× cycle life at 80% DoD and 1C rate) we start with the most difficult as No. 1.

1. Current Distribution Non-Uniformity and its Impact on Cathode:

This is the most problematic issue which becomes dominant as the sizes/area of electrode would increase together with type, position and size of current collector tabs as example going from labs scale coins cells to more realistic tens of Ah pouch cell. This process is characterized by the structural and morphological changes of the sulphur composite cathode and subsequent re-distribution of the existing electron (provided by conductive additives) and ionic distribution channels or paths (provided by the open voids in cathode soaked with electrolyte) present in cathode. Current collector foil allows electrons to flow to and from electrodes thru external circuit by establishing myriad of electrical contact points between active mass and supporting materials such as conductive additives, binders present in composite cathode and forming together functional ionic/electron transporting system.

Upon cycling (charging and discharging) LiS batteries, a volumetric fluctuation of the cathode repeatedly occurs which is further translated to excessive mechanical forces which deeply affect the structural integrity of sulphur composite cathodes by damaging the existing established bonds between sulphur/binders/additives on expansion (discharge) and shrink on (charge) such discrepancy is characteristic for active materials with high volumetric changes such as S (79%), Si (276%), Sn (260%) and others.

Effective electron conduction paths within the sulphur composite cathode together with the present ionic channel, hereby defined as tortuosity factor, are essential part of a successful high energy and cycle life LiS battery, whereby both ion/electron tortuosity must be as short as possible to fully realize the potential of sulphur.

The most commonly used recipe for making a cathode begins with using sulphur which means that a cathode is built at a "charged state" from denser $S_8$ so all internal structures, joints and materials present in cathode must be able to tolerate expansion on first formatting cycle—discharging.

If the cathode is built at "discharged state" it would use $Li_2S$ which is less dense than $S_8$ so such type of cathode must tolerate shrinkage on charging. From the technological point of view it's advantageous to start making a sulphur cathode from $Li_2S$ because higher calendering forces could be applied and more compact and thus denser cathode structures could be made and especially well interconnected structures of active mass-binder-additives is created which is opposite to charged state cathode where calendering—compacting process needs to preserve the spaces/porosity needed to further expansion to $Li_2S$ on discharge.

The negative effect from the continuous cycling where constantly destruction and reforming of electron conductive paths occurs on every full cycle could be partially compensated by the using of long range electrical conductive additives such as CNT or carbon fibres.

2. Current Distribution Non-Uniformity and its Impact on Electrolyte:

Similar way as in previous section volumetric fluctuation of cathode also affects the presence, distribution and exchange of electrolyte between the internal structures of the electrodes and separator soaked because on expansion/contraction (discharge/charge cycles) the changes of cathode porosity proceed in such way that the non-homogeneous current distribution within the planar surface of the cathode start to form areas where electrolyte is expelled out from the deep internal cathode surfaces and start to negatively affect the effective ion-conduction paths in this areas which is further translated to the loss of active mass and low active mass utilization level.

This process is way different that porosity clogging present effect on precipitation of $Li_2S$ upon discharge. The lithium metal foil—anode is stripped on discharge so thickness of the anode goes down as $Li^+$-ions are transferred to cathode where they react with sulphur. In order to do so the cathode must be able to accommodate products of reactions—buffering effect where loss of volume/thickness at anode is compensated by a gain of volume at the cathode at discharge and vice versa on charging.

Open porosity of the sulphur cathode has a significant impact on all parameters of LiS batteries so it's important to fully understand that conversion reactions which proceed by reversible phase transformation—on discharge solid $S_8$ to liquid PS (polysulfides) and subsequently PS to solid $Li_2S$ which is precipitated out from electrolyte. According to the invention it was found that in order to minimize changes of cathode thickness under 30% there is need for engineered cathode structures with tailored porosity which will accommodate and compensate volumetric fluctuation internally.

3. Sulphur Volumetric Expansion:

The cyclical expansion-contraction cycles which occurs in sulphur cathode is defined here as orthorhombic-α $S_8$ 15.49 $cm^3$/mol—fully charged state and $Li_2S$ 27.68 $cm^3$/mol—in fully discharged state where volumetric changes are 79% but according the actual state of knowledge monoclinic-β sulphur with 16.38 $cm^3$/mol precipitate first on re-charge so volumetric fluctuation of sulphur cathode is limited 70%.

Traditional slurry based processes for making sulphur cathodes are not capable of producing complex electrode structures with tailored porosity which are needed to efficiently accommodate sulphur and to provide exact buffering space within internal porosity with minimized impact on variations of cathode thickness where present slurry based cathode have set limits at around 45% porosity where beyond this point any further increasing of porosity is driven by decreasing calendering pressures will further result in low compact density and presence of excessive amounts of dead volume/weight spaces which needs to filled by electrolyte and subsequently loss of structural integrity.

This is due the fact that the cathode calendering is an important part of the process which is essential for establishing efficient current conduction paths (networking mechanism) provided by interaction of neighbouring particles sulphur/binder/additives in slurry.

A sulphur cathode must provide both ionic and electronic conduction paths where expansion on discharging is the most difficult case because it is the source of pore-clogging (ion blocking) effect where presence of large fraction of active surfaces where short chain sulphur compounds start to precipitate and severely limits ion diffusion/$Li^+$ tortuosity of the electrolyte within the deep structures of cathode and subsequently limits current flow because both ionic and electron flow are needed.

So, a finely tuned production process is preferred to balance both high electron conduction present on high calendering forces and more compact structures but decreased ionic current exchange so not to high not to weak properly balanced.

Traditionally those limits are clearly visible by severe limits on realizing full discharge potential of sulphur but significant effort is needed to understand interaction of Li-metal anode because during plating/stripping process it loose structural integrity as example on discharging stripping of Li from the surface of foil occurs and on the opposite side—cathode expansion occurs so finely Li-metal foil is fully dense so all changes would result in changes of thickness as there isn't internal structures which would buffer volume/thickness variations so there is synergy between electrodes when cathode expand anode would shrink—stripping of Li.

4. Low Electrical Conductivity of Sulphur:

Sulphur is one of the best electric insulator with $5 \times 10^{-30}$ S/cm (charged de-lithiated state) while $Li_2S$ (discharged lithiated state) $3.6 \times 10^{-7}$ S/cm so in order to become an active part of multi-electron redox reaction according to the state of the art a significant part of conductive additives is need to be added into cathode during production the step or conductive polymers as a coating over the sulphur particles and various methods of encapsulation or infiltration are applied such as sulphur accommodation and immobilization concept into porous yet conductive structures such as CDC carbide derived micro-meso porous carbon.

5. Polysulphide Dissolution (PS Shuttle) and Loss of Active Sulphur:

PS are intermediate products of sulphur redox reactions defined as $Li_2S_x$, $4 \leq n \leq 8$ whose are freely soluble in common liquid electrolyte. Sulphur active mass present in the cathode during cycling goes thru the phase changes defined as solid-liquid (first, dissolution phase) and liquid-solid (second, precipitation phase) on discharge where subsequently on charging process is reversed.

Loss of active sulphur from the cathode and subsequent migration of PS species between the electrodes is commonly called PS polysulphide shuttle and it result into of high self-discharge, rapid capacity decay, Li metal poisoning and low coulombic efficiency. Various strategies were applied in the literature to deal with PS shuttle defined as composite cathodes with conductive polymer encapsulated sulphur and/or macro-meso-micro porous hosts infiltrated by sulphur, optimizing electrolytes by using solvents with limited PS solubility, using PS anchoring additives (introduction of functional groups or doping strategy) or binders and most used method a functional PS shuttle interlayers deposited on the separator or on the surfaces of sulphur cathode.

PS cycle is a process driven by a concentration gradient between the electrodes provided by presence of solvated PS anion species with high solubility in electrolyte such as $S_8^{2-}$, $S_6^{2-}$, and $S_4^{2-}$ which are freely diffused from cathode to anode where they interact with lithium metal anode and become reduced to the short-chain PS who are subsequently precipitated on the surface of Li metal in the form of insoluble deposits.

This is because of a very limited solubility of $Li_2S_2/Li_2S$. The PS shuttle cycle is closed by subsequent reaction of already precipitated $Li_2S$ with long chain PS present in electrolyte again yielding soluble medium-chain ions which are then diffused back to cathode where they are oxidized.

6, Sulphur Particles Aggregation—Fusing

Sulphur based composite slurry consist from various types of basic structures and morphologies hereby defined as active materials, conductive additives where each could coexist as primary particles in various shapes such as (0D, 1D, 2D, 3D), nano-to-micro aggregates, and clusters. Aggregates are structures formed by interaction of electrostatic forces within particle-conductive additives-binder and or technological processing additives such as thickening agent, dispersant or bridging polymers where clusters are formed by joining aggregates into more complex structures—clusters which are held together by van der Waals interaction.

All those components are now part of cathode slurry which is subsequently coated onto a current collector foil mostly by slot-die coater where during drying of thick coatings, binder migration occurs which further result to coating inconsistencies, and microstructural defects.

As the solvent evaporates from wet electrodes on drying, internal stress develops on the planar surfaces of electrode due to the shrinking effect which causes crack formation, propagation and even delamination from current collector foil.

Electrode drying is a complex TPB triple phase boundary layer process since it involves heat and mass transfer in the solid, liquid, and vapour phases defined as solvent evaporation, diffusion and migration of the binder and sedimentation of the particles. Binder migration on drying builds gradient structures in which presence of binder as well as other additives such as electro-active polymers vary between top and bottom electrode structures while solvent evaporation on drying is responsible for pore forming and stabilization process by emptying the pores towards top surfaces without collapsing surrounding structures.

The final production step which defines the electrochemical properties of battery is the electrode calendering because it has noticeable impact on porosity and tortuosity where during electrode compaction it leads to a reduction in electrode thickness while reduction of porosity and thus increasing areal active mass loading mg/cm² and increase in electrode density thus higher volumetric capacity mAh/cm³ is achieved.

The calendering affects the electrode morphology by changing the distribution of particles/aggregates/clusters where the higher the pressure the less single particles are present and more complex—clusters are formed. The sulphur based cathode is a very specific case because of phase changes between solid-liquid-solid states and thus it needs specific solution to address the challenges related to the sulphur fusion process which is characterized by aggregation and fusing of the sulphur particles which then rapidly grows in size and deteriorate cell capacity which is result of repeating dissolution and precipitation of sulphur during extended cycles.

The origin morphology of already deposited sulphur composite cathode is devastated by the fusing process as small nanoparticles are reformed on recharging into bigger micron where surrounding sulphur materials are scavenged during this process leaving empty voids which were previously occupied by active sulphur clusters which then affect ion diffusion paths and the mass transport kinetics becomes increasingly restrictive due the smaller active surfaces of fused sulphur compared to the high surfaces of pristine nano sulphur.

Traditional Li-ion chemistry doesn't change phase on cycling so fusing is a specific process just for LiS batteries and thus one needs to develop a novel type of battery case which would be different than traditional pouch, cylindrical of prismatic.

7, Low Volumetric Capacity mAh/Cm³:

In the state of the art the low electrical conductivity $5 \times 10^{-30}$ S/cm of sulphur is compensated in the cathode by adding supporting additives such as binders, various conductive additives and or multifunctional binders within the composition per weight such as 70% and other 30% reserved for 20% conductive additive and 10% for binder where in traditional Li-ion batteries the weight content of active mass in cathode is around 95%.

For example NCA cathodes which have an electron conductivity between $10^{-4}$ S/cm to ~$10^{-2}$ S/cm depends on the state of discharge (lithiation) so in order to improve the $e^-$ conductivity and areal active mass capacity together with utilization factor of sulphur based composite cathode a much higher amount average 20% per wt. basis of conductive additives needs to be present in composite cathode.

The main obstacle for LiS is a presence of additives with very low mass densities which according the present wt. content of 20% conductive carbon additive with average density 0.25 g/cm³ where in traditional Li-ion with NCA cathode have less than 3% so by counting on true density of sulphur 2.07 g/cm³ and lithium disulphide 1.66 g/cm³ and required amount of binders in sulphur cathode is often up to 10 wt. % to stick together and establishing billions of contacts points to exchange electrons within sulphur and advanced nano-carbon materials with high specific surface area where all this dead volume/weight materials present in cathode will further downgrade the ratio between active material and non-active supporting materials.

This finally unavoidably lowers the overall energy density of cells because adding 20 wt. % of carbon conductive additive into the cathode slurry would easily occupy over 50% of volume in cathode which is further translated to thicker cathodes which create another significant problem because those dead volume/spaces are there just because excessive amount of low density carbon raised the electrode volume/thickness significantly. So an increased amount of electrolyte must be filled into voids so tight balancing between E/S ratio and areal active mass loading in mAh/cm² and volumetric loading in mAh/cm³.

8. Low Utilization Rate for Sulphur

In order to explore the theoretical potential of sulphur as energy carrier significant changes should be made in cathode architecture such as electrodes with tailored properties defined as aligned porosity, low ion & electron tortuosity factor and lowered amount of dead volume/weight additives and materials.

Transition from randomly oriented electrode microstructures present in existing state of the art Li-ion batteries into next generation engineered 3D electrodes architectures with near-unit tortuosity clearly demonstrated their potential to improve cell capacity on the basis of increasing the active mass utilization level and areal and volume capacity in mAh/cm² and mAh/cm³ especially during high charge/discharges rates.

Sulphur specific complex redox reactions proceed on the basis of exchanging ions/electrons provided by well interconnected electrode structures which then mediate electrochemical reactions with $S_8/Li_2S$ particles where if their surfaces are not in direct e-contact and its isolated from electric conductive network it requires a chemical step provided by dissolved PS or sulphur from surrounding electrolyte.

Building well organized cathode with tailored properties such as, vertically aligned open pore channels allows to realize cathode with desired internal pore networks to accommodate sulphur as well as shorten ionic conduction paths—tortuosity. Present wet slurry based production methods for cathode couldn't be used to build successful 3D sulphur composite cathodes because of randomly distributed internal structures/pores and components which result into non-uniformity in both electron/ion currents flows and subsequently pore clogging effect while blocking $Li^+$ diffusion from the bulk cathode due the non-homogenous expanding on discharging where precipitation of $Li_2S$ proceed on surrounding structures which are part of conductive networks.

Technologies and processed for manufacturing 3D structured electrodes could be summarized as: co-extrusion, freeze casting, laser structuring/ablation, magnetic or electric field alignment of active materials or additives present in slurry, sacrificial pore-forming agent, active or non-active template assisted method, filtration method or semi-solid electrode concept.

9. Excessive E/S Ratio Electrolyte Volume/Weight Ml/g of Sulphur

Electrolytes in lithium-ion batteries would not actively participate on energy storage reactions it should facilitate reversible metal plating/stripping, solvation, and de-solvation and most important ionic transfer—movement of ions between electrodes—ionic currents where only $Li^+$ cations are charge carriers so the presence of electrolyte in cell must be maintained as low as possible and the LTN (lithium transference number) must be as close to unity so dominant movement of cation as charge carriers over non-active anions.

Traditionally the E/S ratio of lab scale cells is between 6 to 18 ml/g so with such poor ratio there is "no-go" for obtaining commercially acceptable LiS battery because of excessive amount of dead volume/weight electrolyte in the cathode where more realistic ratio is <3 ml/g. In principles there is a limiting factor for E/S and that is the size/shape of materials in cathode because during cathode production processes the shape of particles define the electrode porosity which plays a significant role in electrode kinetics because it determines the amount of electrolyte in the cell where the best possible scenario for porosity is around 50% for sulphur based cathode produced by classical slurry casting process and subsequent calendering.

10. Lithium Excess on Anode

Due the continuous consumption of lithium during cycling of the cell defined here as rapid degradation/depletion of the electrolyte by forming thick and porous SEI layer and mossy Li structures throughout the whole thickness of the anode which subsequently expand in excess of 100% of the origin thickness of Li metal foil by aggregation of dead electrochemically inaccessible Li.

There is a need to compensate Li losses by introducing extra amount of lithium which would cover the losses where in existing Li-ion chemistry with traditional anode materials like graphite. There is a minimum Li loss on cycling where most of the losses coming from SEI layer formation during formatting protocol. However, the situation would change for active materials like a silicon anode or high energy Li-rich layered-layered-spinel high voltage cathode where losses of Li are significant (both cathode and anode have losses) and in order to deal with them a new route of introduction of Li into existing Li-ion cells was developed such as mechanically activated stabilized lithium metal powder which is covered by protective layer in such way that it is tolerant to the existing slurry based cell production process.

Using lithium metal foil as anode would have significant effect on the final cell parameters but mostly from the theoretical aspect because electrochemical cells must have properly balanced volumetric capacity in mAh/cm³ for both cathode and anode which is then transferred into different loading and subsequently thickness of the electrodes so using high capacity lithium metal foil hereby defined by theoretical volumetric capacity of 2062 mAh/cm³ vs. common graphite anode 837 mAh/cm³ or 8334 mAh/cm³ for silicon it clear that by increasing the capacity at the anode side would still need to balance this extra anode capacity by increasing the loading of cathode or use cathode with higher capacity but there would still be a critical cathode thickness present at 120 µm and porosity down to 30% which limits overall parameters of the cell.

Here is important to understand that structural rearrangement of Li metal foil into highly porous and mossy anode with presence of inactive Li would degrade final volumetric capacity mAh/cm³ in such way that it would not be competitive with state-of-the-art graphite anode.

WO 2019/081367 A1 teaches a cathode consisting of nanotubes and nanofibers forming a mesh or fabric as a 3D structure. Sulphur is the active component in that cathode.

To solve the above-mentioned problems, it is an objective of the present invention to provide a positive electrode, preferably for an alkali-ion sulphur battery, exhibiting an improved cycle life, gravimetric and volumetric energy content, and areal active mass utilization level.

In order to achieve these and other objects, a positive electrode for e.g. a lithium-sulphur battery is provided as cathode with monolithic architecture which preferably may be defined here as a combination of a sulphur or sulphur based heterogeneous main structure and a branched and/or hyper branched sulphur (see FIG. 2) or sulphur based supporting structures whose altogether forming an self-supporting sulphur or sulphur based structure—which may also be called a sulphur wafer which is capable to provide long range electron conduction paths within its own internal and or external structures.

The inventive cathode comprises a crystalline monolithic-sulphur-structure cathode body. Preferably, the monolithic-sulphur-structure cathode body comprises heterogenous branched and/or hyperbranched structures of twinned sulphur crystals as active electrode material. Those structure may be also called substructures. Preferably the crystalline body, thus the active electrode material is obtained by crystal growth, preferably from seed crystals. Preferably the macroscopic structure of the monolithic-(crystalline)-sulfur structure is a system of twinned-grown or intergrown or interfused or of twinned crystals.

Alternatively, the inventive cathode can be described as comprising a grown monolithic-sulphur-structure cathode body, namely a crystalline sulphur wafer, preferably comprising heterogenous branched and/or hyperbranched structures of twinned sulphur crystals as active electrode material.

According to the present invention a wafer is slurry free structure hence not made from a slurry, hence a suspension of particles. Preferably the wafer is an intergrown/twinned crystal structure/crystal system. The wafer may be grown preferably from myriads of small (nano) seed crystals, preferably of sulphur. Preferably those seed crystals are aligned. Alignment can be reached by e.g., electrostatically supported arrangement of the seed crystals. For that purpose the seed crystals may be attached to a carrier that can be influenced by magnetic or electric fields.

The growth of the wafer may be conducted at temperatures where monoclinic sulfur allotrope exist, preferably at least metastable. The seed crystals, which can also be called first generation crystallization base, may be provided as 1D needle/rod/wire/tube like structures. As the crystal growth occurs further elongation happens and the basic or individual seed crystal(s) become a poly-crystalline body. The connection of the initial basic seed structures isn't mediated by the presence of binder or other agents but direct intergrowth of crystal structures hence crystal twinning/branching/hyper branching.

Therefore a self-standing 3D monolithic unitary body—poly-crystalline sulfur wafer with preferably tailored porosity is formed. A monolith according to the present invention (unitary) structure formed without assistance of binders but with direct crystal inter-twinning/inter-branching mechanism it could be characterized also as PAC free structure Particle—Aggregates—Clusters which is characteristic for slurry electrodes known as state of the art method of producing Li-ion batteries.

A Lithium-Sulphur Battery with a cathode having gravimetric ≥1200 mAh/g, volumetric ≤1200 mAh/cm³ and areal ≥10 mAh/cm² capacity at 0.2C, where at cell level ≥600 Wh/kg.

Preferably this invention includes an environmentally positive (friendly) slurry free electrode and a manufacturing process thereof where production of self-supporting monolithic sulphur and or monolithic branched and/or hyper branched sulphur or sulphur-based structures are created by slurry-free method. The product of that method is preferably an electrode in which all precursors and materials used during production are becoming building blocks of the final sulphur cathode.

Preferably, a building block is an active component of the electrode that is capable of storing energy, transmitting energy, preferably phase transition free (interface free, hence no particle to particle exchange of electrons/ions). Thus, binders and/or other filler material may not fulfil this definition.

In comparison to the definition of the state of the art within existing invention related to the present lithium sulphur batteries our invention demonstrates the direct usage of sulphur as a building block for manufacturing of advanced preferably all-sulphur or almost all-sulphur (sulphur based, preferably more than 82% sulphur more preferably more than 95% or 98% or 99% or 99.9% sulphur) heterogeneous structures of a cathode.

All-sulphur may mean "sulphur only beside inevitable impurities".

Such electrode is very advantageous compared to the common wet slurry-based coatings. With the slurry based electrodes the active sulphur and or sulphur carriers and non-active components such as binder, conductive additives and or technological additive present in cathode slurry must participate in the process of forming supporting internal electrode structures for accommodation of sulphur such as specific types of hoststructures which supporting structure are mostly carbon based.

Such known cathodes however comprise a compressed particle+binder structure which makes it necessary for an electron to travel past several particle-particle or particlebinder-particle barriers. On the one hand the binder consumes a lot of space which cannot be used for active electrode material.

According to the present invention the active electrode material is preferably the active mass during electrochemical redox reaction when storing or releasing energy (charging, discharging battery)

This directly leads to a reduction in gravimetric and volumetric capacity of the cathode. On the other hand, a loss of energy in such known electrodes is detectable which is directly linked to the travel of an electron crossing the aforementioned barriers.

It is therefore a task of the present invention to provide an electrode, in particular cathode, with high gravimetric and volumetric capacity as well as with a reduced loss of energy compared to state-of-the-art electrodes.

Twinning, according to the present invention, may particularly mean an interconnection of crystal or crystalline moieties, preferably by grown crystals thus further crystal moieties. Twinning may e.g. occur by growing at least a second generation of crystals on top of a first generation of crystals (see e.g. FIG. 2) or by an intergrowth of individual crystals fusing the individual moieties to a single crystalline unit as at least one of them grows. The twinning of crystals is, according to the present invention, are preferably present in branched or hyper-branched moieties of the sulphur crystals. Preferably at least two generations of crystals are applied on top of each other in a twinned section. Also, preferably, two or more surrounding/neighbouring crystals are twinned by fusing as explained above.

This task is solved according to the present invention by a cathode according to claim 1.

According to the present invention a cathode is provided, preferably for a rechargeable battery, with a monolithic-sulphur-structure cathode body, namely a sulphur wafer, comprising heterogenous branched and/or hyperbranched structures of twinned sulphur crystals as an/the active electrode material.

With the present invention a so to say (almost) barrier free travel of electrons through the electrode is enabled compared to the slurry formed powder-based electrodes.

According to the present invention a sulphur wafer comprises/has preferably a sulphur structure with the structural characteristics of a grown crystalline sulphur entity.

More preferably a sulphur wafer comprises a monolithic sulphur or structure that comprises the properties according to at least one dependent claim of the present invention.

Also, according to the present invention a sulphur wafer may be a monolithic sulphur-based structure, a grown sulphur crystal structure and/or a second generation sulphur structure of second generation sulphur crystals grown on a first generation sulphur crystal and/or sulphur nanotubes and/or sulphur microtubes and/or sulphur nanofibers and/or sulphur microfiber (in any combination) subsoil. Such structures may be superstructures hence, branched and/or hyperbranched sulphur structures, particularly needles (see FIG. 2).

The monolithic-sulphur-structure is preferably forming the cathode body.

Thus, according to claim 1 of the present invention a cathode is provided, which is preferably made from a single crystalline entity. Such crystalline entity can comprise/consists of a monolithic body made from sulphur, preferably mainly made from sulphur.

That monolithic body may comprise a superstructure.

The term superstructure hereby preferably means a structure of higher order, in particular dendritic systems and/or branched and/or hyperbranched systems that according to one embodiment can encounter a heterogenous structure. Such systems may e.g., be formed by second generation crystal growth as pointed out above.

Figure 2:
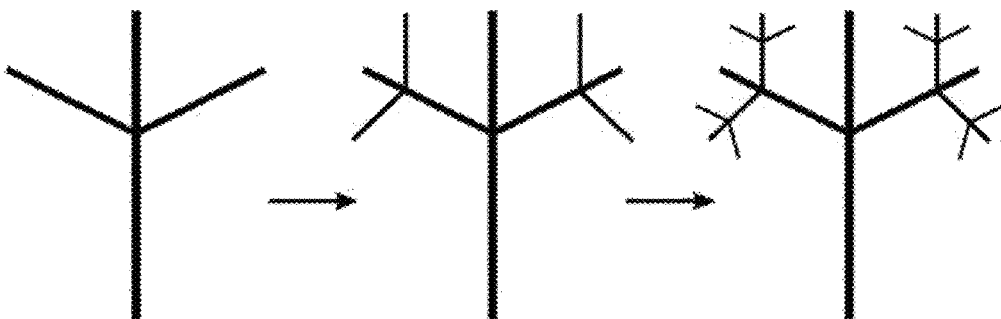
FIG. 2 shows a positive electrode for ed. a lithium-sulphur battery is provided as cathode with mono-lithic architecture which preferablv may be defined here as a combination of a sulphur or sulphur based heterogeneous main structure and a branched and/or hyper branched sulphur.

The term superstructure may also (additionally or alternatively) mean a combination of different kind of sulphur or sulphur-based materials within the monolith structures The term (structurally) heterogeneous hereby preferably is a description of using at least one, preferably two or more kind of structures, namely nanotubes and/or microtubes and/or nanowires and/or nanorods as well as nanofibers and/or micro fibers of sulphur as a substrate for growing a secondary crystalline sulphur structure on top of it, preferably in the form of 1D needles and/or 2D platelets and/or branched and/or hyper-branched crystalline structures. Such secondary sulphur structure may lead to tree like and/or dendrite (secondary) structures (FIG. 2).

Heterogeneous preferably refers to a structure provided by stacking at least 3 layers of aligned/interlaced hollow tubular sulphur nano/micro fibres and/or layers and/or nano/micro tubes.

Preferably 3-200 stacked layers and more preferably 80 layers are interlaced between 15° to 120° and comprised within the monolithic-sulphur structure.

Heterogeneous according to the present invention may preferably (also) mean that the monolithic sulphur structure comprises sulphur in at least 2 different allotropes (different solid states) and/or the macroscopic structure of the monolithic sulphur cathode comprises an uneven distribution of porosity over the monolithic body and/or the macroscopic structure of the monolithic sulphur structure comprises branched and/or hyper branched crystal structure of individual/diverse/varying density and/or individual/diverse/varying distribution and/or individual/diverse/varying shape and/or individual/diverse/varying porosity.

The term monolithic is preferably used according to the present invention in accordance with its common definition meaning made as a single/sole body.

According to the present invention however, this single/sole body is not made by a compression, compaction and/or with powder+binders but via crystal growth from an according mother liquor, preferably as a single crystal. The inventive monolithic body, in particular according to at least one of the claims, may therefore be described as a grown or incubated monolithic body from one or many sulphur crystallisation seed(s) and/or grown on sulphur micro/nano tube and/or fibre subsoil.

This subsoil may according to one embodiment of the present invention provide for the structural integrity of the inventive monolithic-sulphur-structure which may render the inventive monolithic-sulphur-structure self-supporting. The subsoil may also constitute active electrode material.

The monolithic body from a sulphur crystallisation seed according to another embodiment of the present invention may also lead to a self-supporting monolithic-sulphur-structure. Preferably the crystallization is conducted in layers to enhance the structural integrity. Self-supporting could also be called self-standing.

By the above-described methods of production, the dead volume within the monolithic-sulphur-structure and hence within the cathode, which can also be described as porosity, is reduced to a very low percentage (less than 50%, preferably 30%). The low percentage of open (Li⁺ accessible) porosity which is result of the engineered internal cathode structures is still sufficient to carry enough electrolyte for an adequate reaction kinetics with ions from the electrolyte as well as allowing volume fluctuation on cycling.

Accordingly, the gravimetric and volumetric capacity is significantly increased preferably to minimum 1200 mAh/g, volumetric ≥1200 mAh/cm³ and areal ≥10 mAh/cm² capacity at 0.2C, where at cell level ≥600 Wh/kg.

Hence it is not only the binder free structure of the inventive monolithic-sulphur-structure but preferably also a controllable low porosity that may increase capacity of the inventive monolithic-sulphur-cathode.

Also, the crystalline or grown monolithic-sulphur-structure comprises much less, almost no phase transition surfaces that need to be crossed by the electrons traveling between the cathode and the anode, since the inventive monolithic wafer-like body is grown from single seed crystals of sulphur and/or from polycrystalline system(s) with preferably a one-piece of a heterogeneous body is formed from aligned crystals which together create a branched architecture while preferably having engineered internal electrode porosity exhibiting high degree of pore uniformity both in size, shape and/or location within the electrode.

Such structure is having preferably a well-balanced amount of homogeneity represented by the aligned crystals but also heterogeneity represented by structural anisotropy which might be essential to allow in some degree of an internal volumetric self-compensation mechanism where fluctuations of sulphur (sulphur structure volume) on cycling is preferably compensated within the monolithic sulphur body.

The one-piece body may comprise cracks or fragments on a macroscopic scale e.g. some inevitable break points or structural defects from further processing of the monolithic body into the final cathode after its growth. However, those cracks and defects preferably do not dissolve the monolithic impression/character of the cathode, preferably neither those defects are on a scale comparable to compressed powder+ binder cathodes.

The fragments/segments are preferably binder free and may be $10^5$ times bigger than a grain from a powder-based sulphur+binder cathode.

"Binder free" in the sense of the present invention can particularly mean that structural integrity of the crystalline monolithic-sulphur-structure cathode body is independent from any binders. Hence no or essentially no binder is involved in holding the cathode body internally together. Thus, the cathode body is preferably internally binder free, in particular since the cathode body is a grown entity which provides the structural integrity of the cathode body or its cathode body fragments/segments via its crystal lattice/ crystalline structure.

According to a preferred embodiment of the present invention the monolithic superstructure is heterogeneous. Heterogeneity can be expressed according to the invention by a non-uniform crystalline (sulphur) pattern within the monolithic electrode body.

However, heterogeneity may also mean according to the present invention a branched or hyper-branched crystal structure which may be obtained e.g. by a second-generation crystal growth of sulphur crystals on a 1$^{st}$ generation sulphur crystal and/or sulphur-based- and/or sulphur-containing subsoil in particular as described above.

Such 1$^{st}$ generation sulphur crystal and/or sulphur-based and/or sulphur-containing subsoil may be one or several layers of aligned and/or interlaced hollow sulphur nanotubes and/or sulphur nanofibers and/or dispersed sulphur crystals which are preferably comprised (after the second-generation crystal growth) within the monolithic heterogeneous sulphur structure. The sulphur nanotubes or nano fibres may be made by MHDES Magneto-Hydro-Dynamic Electro-Spinning (melt spinning) process. This process may be based on the Lorenz law applied to paramagnetic sulphur species in melted state at desired temperature. The mentioned tubes may be manufactured according to WO 2019/081367.

The first-generation sulphur crystal(s) may be formed by (direct) crystal printing.

Accordingly, preferably aligned, hollow 1D sulphur fibres (nanotubes) preferably in the form of continuous fabric as precursor for building monolithic sulphur cathode may be fabricated by advanced melt electrospinning method.

The nano fibres may be an intermediate during the production of nanotubes. The same may apply to microtubes and microfibres.

The diameter of such tubes and fibres may preferably range from 120 nm (nanotubes) up to 25 μm (microtubes).

A cathode having a combination of hollow and solid sulphur active mass will preferably further consist/comprise from of sulphur nano and or micro tubes and/or nano or micro rods or wires and/or nano or micro platelets as described beforehand, preferably its monolithic-sulphur-structure, comprises preferably between 8 and 65% wt. of monoclinic sulphur allotrope, more preferably 35% or more of the monolithic sulphur allotrope hence, the ratio between hollow/solid active sulphur is preferably 65/35 hereby defined as example of monolithic sulphur wafer having 65% wt. content of sulphur nanotubes (hollow) and 35% wt. content of sulphur nanowires (solid) forming an branched and or hyper-branched structure where together forming an active sulphur mass. A preferred ratio might be in the range of 50/50 to 90/10.

Cathode having solely solid sulphur active mass will further consist from sulphur nano or micro rods or wires and/or nano or micro platelets as described beforehand, preferably its monolithic-sulphur-structure, comprises between 64% and 99.9% wt. of monoclinic sulphur allotrope, more preferably 98% hereby defined as example (solid) sulphur nanowires forming branched and or hyperbranched structures where together forming an active sulphur mass.

According to an embodiment of the present invention the monolithic-sulphur-structure is self-standing or self-supporting, thus the monolithic-sulphur-structure is provided independently from any kind of, preferably internal, support on which the electrode material is carried.

According to one embodiment, the cathode is a sulphur only structure beside inevitable impurities. The beforehand described structural entities enable provision of the cathode without active element (sulphur) free support, e.g. a carbon substructure onto which the sulphur may be attached.

According to another embodiment the structural integrity is provided by the sulphur crystal and or polycrystalline structure itself, by a dendritic crystal system based on sulphur and/or a subsoil as described above.

According to a preferred embodiment, monolithic sulphur superstructure where monoclinic sulphur crystals are grown from seed crystal hosted by 1D and 2D particles or on a nanotube/microtube/nanofiber/microfiber entity in a sulphur containing process liquid preferably at a temperature between 95° C. to 120° C.

According to an embodiment of the invention a protective layer for the monolithic sulphur body may be provided on the surface of the monolithic-sulphur body as a suitable polymer or polymers having ion and/or electron conductivity where preferable a polymer or polymers with mixed ion/electron conductivity, metal decorated rGO and/or metal oxide layer to keep the sulphur structure intact. This means that the full encapsulation applied as single or composite layer over the whole monolithic sulphur body with the suitable polymer and/or metal oxide layer is more effective than traditionally used PS dissolution prevention method applied to the single composite sulphur particles while our invention of monolithic sulphur wafer significantly reduce poly-sulphide dissolution effect.

This layer and or layers (composite) may also be the conductive layer (electron- and ion-transporting layer) where polymeric and/or metal oxide and/or metal decorated rGO layer or layers could be made by spray-coating, dip-coating and or chemical oxidative polymerization and/or electrochemically method such as EPD where suitable material or materials to be deposited or co-deposited must to be polarizable (positive or negative charge carriers) or possess the ability to sustain induced dipoles.

Where preferable composite encapsulation layer further consist from combination of at least 3 types of layers which together form a functional protective composite layer namely a) sulphur rich crosslinked polymer and or co-polymer layer, b) chemically generated metal oxide preferably $MnO_2$ layer by direct oxidation of sulphur with suitable oxidant such as $Mn^{7+}$ and c) metal decorated rGO layer deposited from positively charged metal cation adsorbed on the graphene oxide layers by the cathodic EPDR electro-phoretic deposition and $M^{x+}$ reduction method and subsequent electrochemical deoxygenation of GO. Reduction of the adsorbed metal cation into metal decorated rGO where preferable cation is $Fe^{2+}$ but not limited to rFeGO. Where preferable arrangement of such composite layer is a+b+c but not limited to any combinations such as tri-layer b+a+c or bi-layer such as a+c.

According to an embodiment of the invention an electron- and ion-transporting layer is provided on the surface of the monolithic-sulphur body by a, preferably uniform, preferably π-electron conjugated, polymer and/or metal and/or metal oxide conductive layer.

According to an embodiment of the invention the polymer conductive layer is photochemically crosslinked with the surface of the existing monolithic-sulphur-body where free electrons for reaction is provided by the photo-excited sulphur di-radicals where source of energy for excitation could be intense pulse light and/or laser beam and or gamma irradiation.

Conductive polymer is preferably sulphur rich and not soluble to the electrolyte and may be selected from the group consisting of PANI polyaniline, PPY polypyrrole, PTH polythiophene, PEDOT poly(3,4-ethylenedioxythiophene), poly(3,4-ethylenedioxythiophene) polystyrene sulfonate (PEDOT:PSS), PAN poly(l-acrylonitrile), Poly(3,4-ethylenedioxythiophene)-co-poly (ethylene glycol) (PEDOT-co-PEG), poly(phenylenevinylene) (PPV), Poly (3-hexylthiophene-2,5-diyl) (P3HT), poly(9,9-dioctylfluorene-co-fluorenone-co-methyl benzoic ester) (PFM).

Introduction of iodine to the sulphur melt may reduce its viscosity prior to its processing into sulphur nano and or microtubes.

A battery, preferably a lithium-sulphur electrochemical battery with preferably cathode exceeding threshold parameters defined here as gravimetric ≥1200 mAh/g, volumetric ≥1200 mAh/cm³ and areal ≥10 mAh/cm² capacity at 0.2C, where at cell level ≥600 Wh/kg may comprise the inventive cathode with the following preferred parameters:

A single side thickness between 50 μm to 250 μm, and/or monolithic body—sulphur wafer which preferably exhibiting an heterogeneous structure provided by preferably stacking at least 3 layers of aligned/interlaced hollow tubular sulphur fibers with diameters ranging preferably from 120 nm (nanotubes) up to 85 μm (microtubes) with preferably active sulphur content in cathode ≥85% wt. and more preferable 90% and where monolithic sulphur wafer preferably provides a substrate for intergrowth of secondary active mass preferably sulphur nanorods and/or nano tubes forming a branched and/or hyper-branched heterogeneous monolithic sulphur body for a cathode where the degree of alignment of the resulting monolithic body is preferably ≥85% and preferably where cell capacity reproducibility between each manufactured cathodes hereby represented by the volumetric and areal loading exhibit high degree of uniformity ≥99.2% leaving less than 0.8% deviation for capacity mismatch.

According to the present invention the cathode preferably has a monolithic and/or heterogeneous body—sulphur wafer cathode.

According to one aspect the present invention may also be directed to a method of production of a monolithic-sulphur-wafer like cathode where sulphur is having fibrous and or hollow fibrous properties preferably originated from the advanced melt spinning method from the liquid sulphur melt exhibiting paramagnetic properties at a preferred temperature from 119° C. to 415° C. at 1.01325 bar or between 140° C. and 650° C. at 10 bar and preferably subsequent combination of drawing, stretching and/or quenching cycles of the resulting sulphur fibres and or sulphur nanotubes or microtubes.

According to another aspect the present invention may also be directed to a method of production of a branched and or hyper-branched monolithic-sulphur-wafer like cathode with a self-standing sulphur substrate, a secondary sulphur structures which intergrowth within the available voids present in substrate together providing and/or an engineered monolithic branched sulphur cathode with tailored porosity capable to internally compensate volumetric changes of sulphur on cycling.

According to a further aspect the present invention may also be directed to a solvent free and/or slurry free and/or IR drying free and/or calendering free and/or binder free electrode production method for building a monolithic sulphur wafer-like cathode as described herewith which preferably further consist from adhesive bonding of the monolithic sulphur wafer cathode into the current collector foil and/or substrate coated with layer of electrically conductive adhesive with conductive fillers and polymer matrix.

Preferably the (heterogeneous) monolithic sulphur body, which may also be called monolithic-sulphur-structure, which enters into cathode and subsequently a battery production process consist preferably from 96% wt. and more preferable 98% wt. of sulphur, while preferably exhibiting self-supporting properties in such way that preferably an laser cut & pick & place production process is applicable.

According to a preferred embodiment, the cathode has a symmetrical shaped with standard size deviation ≥15% where more preferable ≥1.5% hereby represented preferably by a) circle, b) square, c) hexagon, d) octagon and other subsequent symmetrical shapes capable to accommodate equally balanced number of the current collector tabs hereby defined as each single electrode is having ≥2 tabs symmetrically distributed on the current collector foil/substrate.

Preferably the cathode comprises a primary supporting positive mass—comprising a (heterogeneous) monolithic body consisting from sulphur nanotubes as building block—sulphur wafer where the cathode is preferably having a shape and size matched to the net shape of a current collector foil including a conductive additives the cathode may additionally or alternatively also comprise a secondary positive mass, namely sulphur cathode mass intergrown within the primary positive mas of the monolithic sulphur wafer The final monolithic sulphur wafer—assembled into cathode may comprise any of the following structures arranged in FIG. 1 in any combination. Any feature A to H is disclosed separately and allows a separate unit and not to be understood to be disclosed in combination A to H only but also as separate features:

A. Preferably the primary positive mass—comprises or consist of crystalline sulphur such as nano or micro tubes and/or nano or micro wires and/or nano or micro rods and/or nano or micro platelets which represent 2D structures and/or sulphur nano or micro fibres as building blocks (hollow structures)—hence a sulphur wafer (3D sulphur structure) where cathode is preferably having a shape and size matched to the net shape of the current collector foil including a conductive additives and binders B. If such mass is applicable, preferably the secondary positive mass—comprises a sulphur allotrope where more preferable monoclinic 1D rods and or 1D needles and or 2D platelets intergrowth within the main body of monolithic sulphur wafer A, namely the primary positive mass. The secondary positive mass preferably applies to a nanotube/microtube and/or a nanofiber/microfiber primary positive mass. The Mass B may be at least partially arranged inside the mass A, in particular within the internal voids of the structure of A, lowering the original porosity of A and preferably also interconnecting/bridging pores and/or sides of individual pores.

C. Assembled monolithic sulphur cathode

D. An electro-conductive adhesive layer with thickness ≥10 μm and more preferable 6 μm where optionally exhibiting patterned surface E. Preferably the final cathode comprises a current collector foil with thickness between 8-20 μm and more preferable 12 μm F. Preferably the intermediate cathode/ion permeable transition layer with thickness between 2-10 μm and more preferable 5 μm G. Preferably the cathode supported non-detachable electric insulating but yet ion permeable layer with thickness between 8-25 μm and more preferable 14 μm H. Heterogeneous monolithic sulphur wafer with A and preferably B.

FIG. 2 shows the basic principle of a dendrimer thus a branched or hyperbranched structure. Starting from a primary base structure which might be a (monolithic) filament of sulphur nanotube/microtube and/or a nanofiber/microfiber or a crystal structure itself, preferably 1D (1 dimensional, hence growing/grown along one axis thus needle/tube like) branches of deposited crystal mass is grown/arranged on the primary base structure (second generation of twinning or crystal growth). That process can be repeated to grow a third or higher generation of twinning wherein preferably the next generation of 1D structures is grown at least partially, preferably mainly, most preferably exclusively on the last twinning generation below.

By this process also an interconnection of individual sulphur nanotubes/microtubes and/or a nanofibers/microfibers may be achieved extending the electron/ion exchanging network.

By such arrangement, a sulphur structure may be grown on a sulphur base structure forming a monolithic sulphur (slurry free) structure (engineered structure with tailored porosity).

The invention claimed is:

1. A cathode comprising:
   a crystalline monolithic-sulphur-structure cathode body,
   wherein the cathode body comprises a grown sulphur wafer comprising heterogenous branched and/or hyperbranched structures of twinned sulphur crystals as active electrode material.

2. The cathode of claim 1, wherein the active electrode material, is the monolithic-sulphur-structure cathode body, which further comprises a combination of at least two types of sulphur allotropes having different crystal lattices.

3. The cathode of claim 1, wherein the monolithic-sulphur-structure cathode body comprises an engineered, sulphur-superstructure having a structure of higher order and/or alignment.

4. The cathode of claim 1, wherein the monolithic-sulphur-structure cathode body comprises at least 3 layers of aligned and/or interlaced hollow tubular sulphur nanotubes and/or nanofibers and/or microtubes and/or microfibers and/or skin-core fibrous structures.

5. The cathode of claim 1, wherein the cathode has characterized in having a density gradient between an inner core and an outer shell of individual crystalline entities including nanotubes and/or nanofibers and/or microtubes and/or microfibers and/or skin-core fibrous structures of the crystalline monolithic-sulphur-structure cathode body.

6. The cathode of claim 1, wherein the total mass content of sulphur in the monolithic-sulphur-structure cathode body is ≥92 wt. % of the sulphur allotropes, and/or where the content of the sulphur present in the monolithic wafer-like cathode is ≥85 wt. %.

7. The cathode of claim 1, wherein the monolithic-sulphur-structure cathode body is self-supporting.

8. The cathode of claim 1, wherein the monolithic-sulphur-structure cathode body is provided independently from additional, internal support in/on which the electrode material would be carried and/or hosted.

9. The cathode of claim 1, wherein the monolithic-sulphur-structure cathode body is provided independently from a foreign support in/on which the electrode material would be carried and/or hosted.

10. The cathode of claim 1, wherein the structural integrity of the sulphur wafer is provided by the sulphur crystal structure and/or polycrystalline structure, hence the grown crystalline entity itself.

11. The cathode of claim 1, wherein the monolithic-sulphur-structure cathode body holds on its outer edges and/or surfaces an electrically conductive and ion permeable layer which is an integral non-detachable part of the monolithic sulphur wafer.

12. A battery comprising a cathode of claim 1.

13. A method for production of a cathode of claim 1, the method comprising growing aligned monoclinic sulphur crystals directly from seed crystals present in a sulphur containing mother liquid at a temperature from 95° C. to 120° C. and subsequent quenching the resulting monolithic monoclinic sulphur structure between −8° C. to −210° C.

14. The cathode of claim 8, wherein the additional, internal support comprises a three-dimensional graphene foam.

15. The battery of claim 12, wherein the battery is a rechargeable battery.

* * * * *